United States Patent
Josiam et al.

(10) Patent No.: US 9,237,475 B2
(45) Date of Patent: Jan. 12, 2016

(54) CHANNEL QUALITY INFORMATION AND BEAM INDEX REPORTING

(71) Applicant: Samsung Electronics Co., Ltd., Suwon-si, Gyeonggi-do (KR)

(72) Inventors: Kaushik Morapakkam Josiam, Dallas, TX (US); Ankit Gupta, Redmond, WA (US); Shadi Abu-Surra, Plano, TX (US); Zhouyue Pi, Allen, TX (US); Ying Li, Richardson, TX (US); Sridhar Rajagopal, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 261 days.

(21) Appl. No.: 13/781,311

(22) Filed: Feb. 28, 2013

(65) Prior Publication Data
US 2013/0235742 A1    Sep. 12, 2013

Related U.S. Application Data

(60) Provisional application No. 61/609,204, filed on Mar. 9, 2012.

(51) Int. Cl.
*H04W 24/10* (2009.01)
*H04W 72/04* (2009.01)

(52) U.S. Cl.
CPC ............ *H04W 24/10* (2013.01); *H04W 72/046* (2013.01)

(58) Field of Classification Search
None
See application file for complete search history.

(56) References Cited

U.S. PATENT DOCUMENTS

| 2006/0233131 | A1 | 10/2006 | Gore et al. | |
| 2007/0160162 | A1* | 7/2007 | Kim | H04B 7/0452 375/267 |
| 2008/0080635 | A1 | 4/2008 | Hugl et al. | |
| 2009/0060010 | A1* | 3/2009 | Maheshwari et al. | 375/211 |

(Continued)

FOREIGN PATENT DOCUMENTS

| EP | 1 981 198 A1 | 10/2008 | |
| WO | WO 2008/069427 A1 | 6/2008 | |
| WO | WO 2009/137092 A1 | 11/2009 | |
| WO | WO 2011/124025 | * 10/2011 | H04L 1/12 |

OTHER PUBLICATIONS

International Search Report dated Jul. 11, 2013 in connection with International Patent Application No. PCT/KR2013/001907, 3 pages.

(Continued)

*Primary Examiner* — Chirag Shah
*Assistant Examiner* — Rina Pancholi

(57) ABSTRACT

A method and apparatus report or identify channel quality information. The method for reporting includes selecting one or more beams for channel quality reporting. The method also includes mapping, by the UE, indices of the one or more selected beams to one or more channel quality values. Additionally, the method includes sending channel quality information for the one or more selected beams according to the mapping. The method for identifying includes receiving an indication of indices of one or more beams selected for reporting. The method also includes receiving channel quality information for the one or more selected beams. The method further includes identifying a mapping of the indices of the one or more selected beams to one or more channel quality values. Additionally, the method includes identifying a channel quality value for each of the one or more selected beams according to the mapping.

36 Claims, 10 Drawing Sheets

(56) References Cited

U.S. PATENT DOCUMENTS

| | | | |
|---|---|---|---|
| 2010/0075705 A1* | 3/2010 | Van Rensburg | H04B 7/024 455/509 |
| 2010/0103900 A1 | 4/2010 | Yeh et al. | |
| 2010/0322223 A1 | 12/2010 | Choi et al. | |
| 2011/0065448 A1* | 3/2011 | Song et al. | 455/452.2 |
| 2013/0028340 A1* | 1/2013 | Yang et al. | 375/260 |

OTHER PUBLICATIONS

Written Opinion of International Searching Authority dated Jul. 11, 2013 in connection with International Patent Application No. PCT/KR2013/001907, 5 pages.

Extended European Search Report dated Sep. 4, 2015 in connection with European Application No. 13758151.8, 6 pages.

* cited by examiner

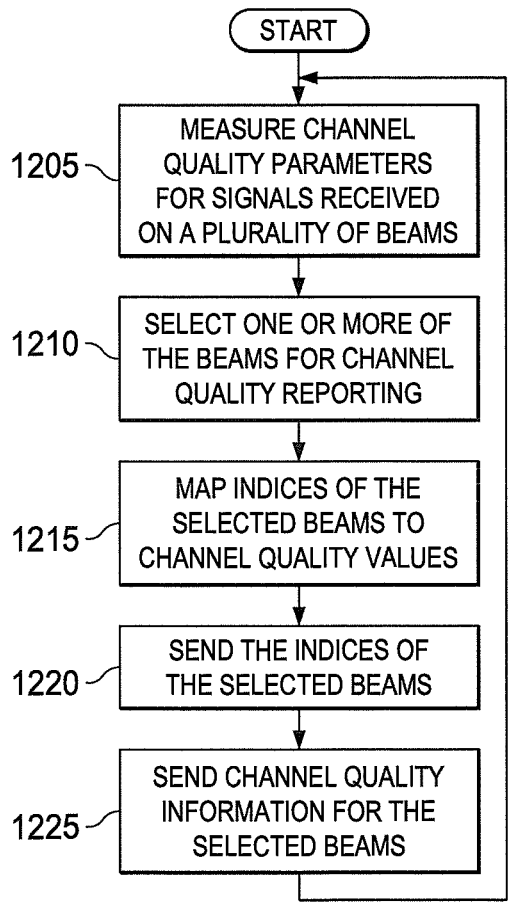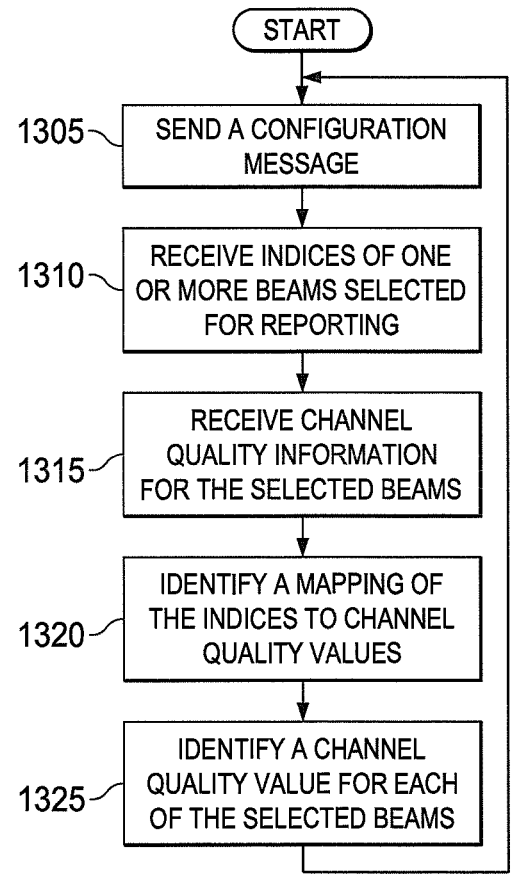
FIG. 12
FIG. 13

CHANNEL QUALITY INFORMATION AND BEAM INDEX REPORTING

CROSS-REFERENCE TO RELATED APPLICATION(S) AND CLAIM OF PRIORITY

The present application claims priority to U.S. Provisional Patent Application Ser. No. 61/609,204 filed Mar. 9, 2012, entitled "METHODS AND APPARATUS FOR CQI REPORTING IN MILLIMETER WAVE SYSTEMS". The content of the above-identified patent document is incorporated herein by reference.

TECHNICAL FIELD

The present application relates generally to wireless communication systems and, more specifically, to reporting channel quality information for beams used in a wireless communication system.

BACKGROUND

In recent years, the number of subscribers to mobile communication services has exceeded five billion and is growing quickly. Mobile communication technologies have been developed to attempt to satisfy the increasing demand and to provide more and better mobile communication applications and services. As more people use mobile communication systems and more services are provided over these systems, there is an increasing need for mobile communication systems with larger capacity, higher throughput, lower latency, and better reliability.

Conventionally, millimeter waves refer to radio waves with wavelength in the range of 1 mm to 10 mm, which correspond to radio frequencies of 30 GHz to 300 GHz. These radio waves exhibit unique propagation characteristics. For example, compared with lower frequency radio waves, they suffer higher propagation loss, have poorer ability to penetrate objects, such as buildings, walls, foliage, and are more susceptible to atmosphere absorption, deflection and diffraction due to particles (e.g., rain drops) in the air. On the other hand, because of their smaller wave lengths, more antennas placed into a relative small area, thus enabling high-gain antenna in a small form factor. In addition, due to the aforementioned deemed disadvantages, these radio waves have been less utilized than lower frequency radio waves. Additionally, higher frequencies in the super high frequency (SHF) band (e.g., 3 GHz to 30 GHz) also exhibit similar behavior as radio waves in the extremely high frequency (EHF) band (i.e., millimeter waves), such as large propagation loss and the possibility of implementing high-gain antennas in small form factors.

Vast amount of spectrum are available in the millimeter wave band. For example, the frequencies around 60 GHz, which are typically referred to as 60 GHz band, are available as unlicensed spectrum in most of the countries. Recently, many engineering and business efforts have been invested to utilize the millimeter waves for short-range wireless communication.

Therefore, there is a need for improved wireless communication systems and, more specifically, to reporting channel quality information for beams used in a wireless communication system.

SUMMARY

Embodiments of the present disclosure provide methods and apparatuses for reporting and identifying channel quality information.

In one embodiment, a method for reporting channel quality information by a user equipment (UE) is provided. The method includes selecting one or more beams for channel quality reporting. The method also includes mapping, by the UE, indices of the one or more selected beams to one or more channel quality values. Additionally, the method includes sending channel quality information for the one or more selected beams according to the mapping.

In another embodiment, an apparatus in a user equipment (UE) configured to report channel quality information includes a controller and a transmitter. The controller is configured to select one or more beams for channel quality reporting, and map indices of the one or more selected beams to one or more channel quality values. The transmitter is configured to send channel quality information for the one or more selected beams according to the mapping.

In yet another embodiment, a method for identifying channel quality information by a network entity is provided. The method includes receiving an indication of indices of one or more beams selected for reporting. The method also includes receiving channel quality information for the one or more selected beams. The method further includes identifying a mapping of the indices of the one or more selected beams to one or more channel quality values. Additionally, the method includes identifying a channel quality value for each of the one or more selected beams according to the mapping.

In another embodiment, an apparatus in a network entity configured to identify channel quality information includes a receiver and a controller. The receiver is configured to receive an indication of indices of one or more beams selected for reporting and receive channel quality information for the one or more selected beams. The controller is configured to identify a mapping of the indices of the one or more selected beams to one or more channel quality values and identify a channel quality value for each of the one or more selected beams according to the mapping.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates a flowchart of a process for reporting channel quality information in accordance with various embodiments of the present disclosure; and FIG. 13 illustrates a flowchart of a process for identifying channel quality information in accordance with various embodiments of the present disclosure.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that improved wireless communication systems may use individual transmission beams or communication paths at different directions to perform wireless communication. Given the number of different transmission paths possible between two communication points, the present disclosure recognizes that it may be advantageous to select which of the beams may have the best performance for wireless communication. Embodiments of the present disclosure further recognize that the transmission node may need to have information regarding the quality of the channel for the beam(s) being used for communication in order to perform effective and efficient wireless communication.

Accordingly, embodiments of the present disclosure provide systems and methods for mapping channel quality information to one or more beams selected for wireless communication. Embodiments of the present disclosure also provide systems and methods for communicating beam selections and associated channel quality information in a manner so as to reduce and/or minimize the amount signaling overhead needed to communicate channel quality information while maintaining effective and efficient wireless communication.

Figure 1:
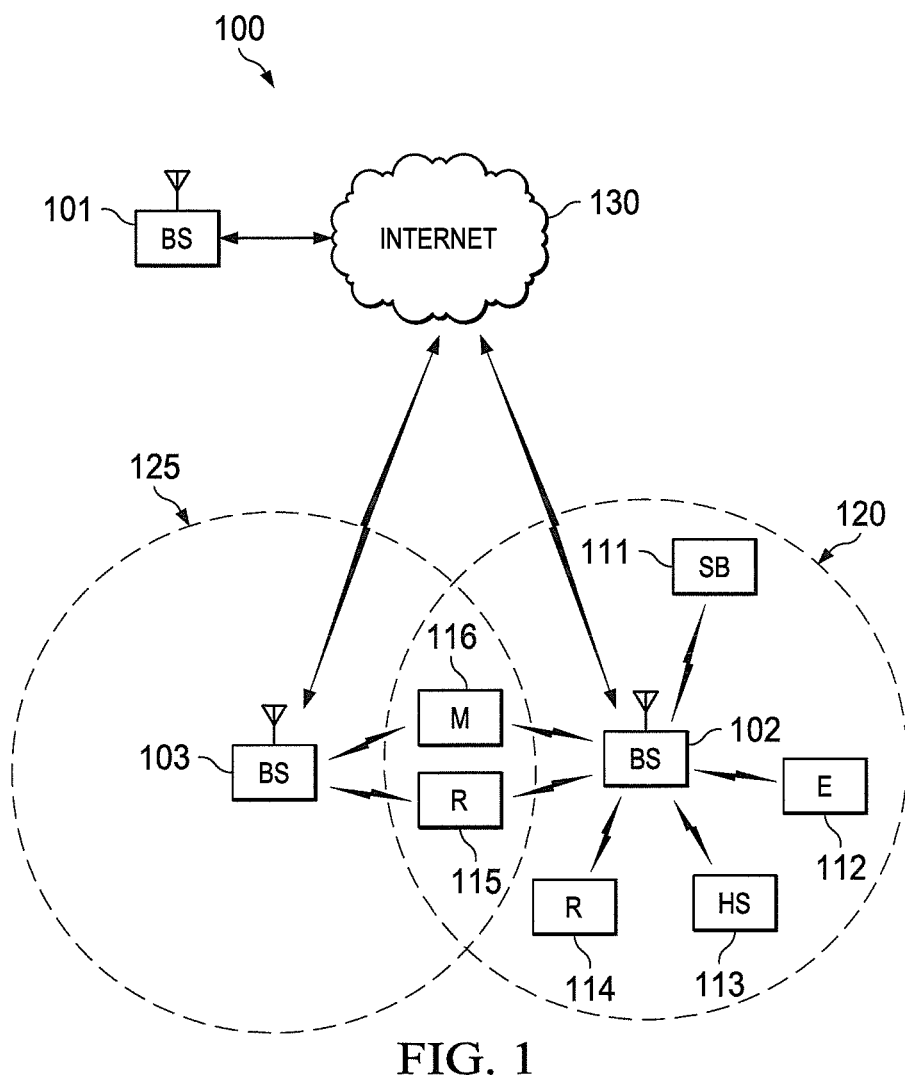
FIG. 1 illustrates an exemplary wireless system which transmits messages in accordance with an illustrative embodiment of the present disclosure.
Figure 2:
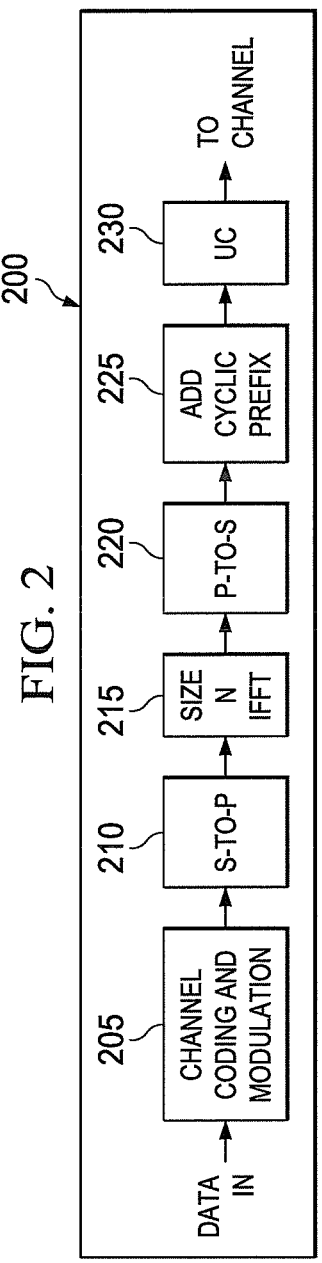
FIG. 2 illustrates a high-level diagram of an orthogonal frequency division multiple access transmit path in accordance with an illustrative embodiment of the present disclosure.
Figure 3:
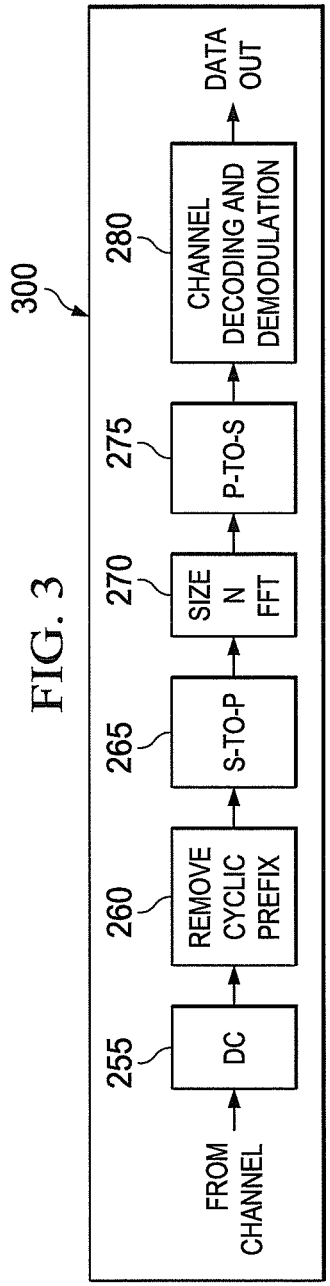
FIG. 3 illustrates a high-level diagram of an orthogonal frequency division multiple access receive path in accordance with an illustrative embodiment of the present disclosure.

FIGS. 1-3 below describe various embodiments implemented in wireless communication systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of user equipment (e.g., mobile phone, mobile station, subscriber station) within coverage area 120 of base station 102. The first plurality of user equipment includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless laptop, a wireless PDA, or the like.

Base station 103 provides wireless broadband access (via base station 101) to Internet 130 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that wireless system 100 may provide wireless broadband access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via Internet 130. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a user equipment (e.g. user equipment 116 of FIG. 1). In other examples, for uplink (UL) communication, the receive path circuitry 300 may be implemented in a base station (e.g. base station 102 of FIG. 1) or a relay station, and the transmit path circuitry 200 may be implemented in a user equipment (e.g. user equipment 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to user equipment 111-116 and may implement a receive path that is analogous to receiving in the UL from user equipment 111-116. Similarly, each one of user equipment 111-116 may implement a transmit path corresponding to the architecture for transmitting in the UL to base stations 101-103 and may implement a receive path corresponding to the architecture for receiving in the downlink from base stations 101-103.

Cellular systems are expected to evolve from the 4G (LTE, 802.16m) systems of today to a fifth generation (5G) which promises even larger data rates (e.g., up to 100 times greater). One of the candidates for the 5G system is the use of millimeter wave bands in place of current personal communication services (PCS) microwave bands used in 4G systems. The millimeter wave frequencies are an order of magnitude greater than the PCS bands of today. The nature of propagation is different in millimeter wave bands in that the propagation loss over wireless is much larger than what is observed in the microwave bands. Given the larger wavelength, the size of the antenna required to transmit millimeter waves is much smaller compared to those required for microwave bands. However, the smaller antennae can be packed in an area comparable to the antenna area for a microwave band. When this antenna array is "operated" synchronously, they form a beam whose gain can make up for the higher propagation loss. Operating the antenna synchronously requires transmitting the same signal over antennae with different phase shifts. The phase shifts can just be the path length difference for the transmitted wave from a given antenna measured with respect to a reference antenna in the array. There are many other ways for computing and applying the phase shifts. The phase shifts for an antenna array are called analog weight vectors.

Figure 4:
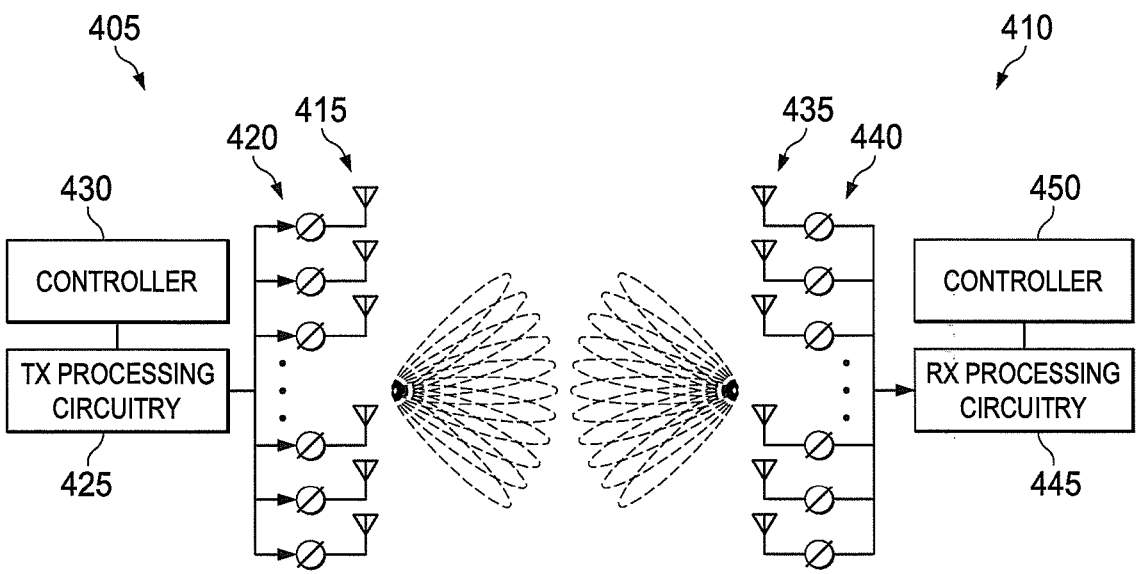
FIG. 4 illustrates a block diagram of a transmitter and a receiver in a wireless communication system that may be used to implement various embodiments of the present disclosure.

FIG. 4 illustrates a block diagram of a transmitter 405 and a receiver 410 in a wireless communication system that may be used to implement various embodiments of the present disclosure. In this illustrative example, the transmitter 405 and the receiver 410 are devices at a communication point in a wireless communications system, such as, for example, wireless system 100 in FIG. 1. In some embodiments, the transmitter 405 or the receiver 410 may be a network entity, such as a base station, e.g., evolved node B (eNB), or remote-radio head, a relay station, or underlay base station. In other embodiments, the transmitter 405 or the receiver 410 may be a user equipment (e.g., mobile station, subscriber station, etc.). In one example, the node 400 is an example of one embodiment of the user equipment 116 in FIG. 1. In another example, the node transmitter 405 or the receiver 410 is an example of one embodiment of the base station 102 in FIG. 1.

The transmitter 405 comprises antenna array 415, phase shifters 420, TX processing circuitry 425, and controller 430. The transmitter 405 receives analog or digital signals from outgoing baseband data. Transmitter 405 encodes, multiplexes, and/or digitizes the outgoing baseband data to produce a processed RF signal that is sent and/or transmitted via TX antennas 405. For example, the TX processing circuitry 425 may implement a transmit path that is analogous to the transmit processing circuitry 200 in FIG. 2. Transmitter 405 may also perform spatial multiplexing via layer mapping to different antennas in antenna array 415 to transmit signals in multiple different beams. The controller 430 controls the overall operation of transmitter 405. In one such operation, controller 430 controls the transmission of signals by the transmitter 410, in accordance with well-known principles.

For a millimeter wave cellular system, the antennas 435 in the transmitter 405 (e.g., a UE or a BS) are arranged as an array and connected through different phase shifters 420 to the TX processing circuitry 425 that has up-converters and other components in this pathway. The analog and digital baseband chains are connected through a digital to analog converter at the transmitter 405. The transmitter 405 performs beamforming by applying analog weight vectors to concentrate radiated energy in specific directions over the others to transmit signals. This concentrated radiation is called a spatial beam. By changing the phase shifts applied (e.g., at phase shifters 420), different spatial beams can be deployed.

Receiver 410 receives from antenna array 435 an incoming RF signal or signals transmitted by one or more transmission points, such as base stations, relay stations, remote radio heads, user equipment, etc. Receiver 410 includes RX processing circuitry 445 that processes the received signal(s) to identify the information transmitted by the transmission point(s). For example, the Rx processing circuitry 445 may down-convert the incoming RF signal(s) to produce an intermediate frequency (IF) or a baseband signal by channel estimation, demodulating, stream separating, filtering, decoding, and/or digitizing the received signal(s). For example, the Rx processing circuitry 445 may implement a receive path that is analogous to the receive processing circuitry 300 in FIG. 3. The controller 450 controls the overall operation of the receiver 410. In one such operation, the controller 450 controls the reception of signals by the receiver 410, in accordance with well-known principles.

For a millimeter wave cellular system, the antennas 435 in the receiver 410 (e.g., a UE or a BS) are arranged as an array and connected through different phase shifters 440 to the TX processing circuitry 445 that has down-converters and other components in this pathway. The analog and digital baseband chains are connected through an analog to digital converter at the receiver 410. The receiver 410 performs beamforming by applying analog weight vectors to concentrate radiated energy in specific directions over the others to receive transmitted signals. This concentrated radiation is called a spatial beam. By changing the phase shifts applied (e.g., at phase shifters 440), different spatial beams can be deployed.

The illustration of transmitter 405 and a receiver 410 illustrated in FIG. 4 is for the purposes of illustrating one embodiment in which embodiments of the present disclosure may be implemented. Other embodiments of the transmitter 405 and a receiver 410 could be used without departing from the scope of this disclosure. For example, the transmitter 405 may be located in communication node (e.g., BS, UE, RS, RRH) that also includes a receiver such as receiver 410. Similarly, the receiver 410 may be located in communication node (e.g., BS, UE, RS, RRH) that also includes a transmitter such as transmitter 405. Antennas in the TX and Rx antenna arrays in this communication node may overlap or be the same antenna arrays used for transmission and reception via one or more antenna switching mechanisms.

Figure 5:
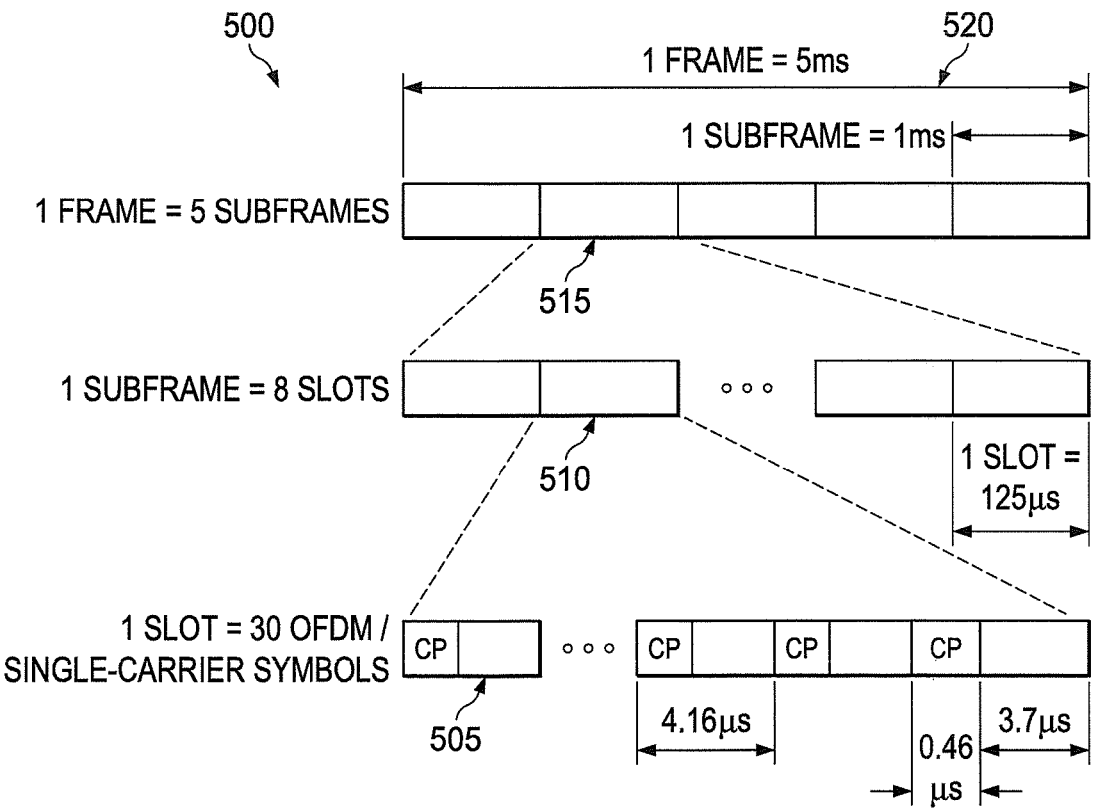
FIG. 5 illustrates an example of a frame structure that may be utilized in a fifth generation (5G) wireless communication system.

FIG. 5 illustrates an example of a frame structure 500 that may be utilized in a fifth generation (5G) wireless communication system. In the frame structure 500, OFDM symbols 505 are grouped into slots 510 for scheduling granularity. For example, 30 OFDM symbols form a slot 510 in a 5G system. Eight slots 510 form a subframe 515 and five subframes 515 form a frame 520. These different granularities like symbol 505, slot 510, subframe 515, and frame 520 illustrate the granularity for transmitting data, control and reference symbols. Each OFDM symbol is 4.16 µs long, a slot made up of 30 OFDM symbols is 125 µs long; a subframe is 1 ms long and a frame is 5 ms long.

Beamforming is expected to be a mainstay of 5G wireless communication systems. Beamforming indicates the directive nature of transmission for both control and data. Directivity depends, among other things, on the location of the user equipment relative to the base station, the amount of shadowing and the presence of reflectors in the vicinity. As a result, to identify the optimum direction for transmission between the UE and the BS, some form of training may be needed. The different directions for transmissions are called beams and UEs have to identify the best beam or beams that can support transmission between the UE and the BS. The BS transmits reference symbols in different directions and the UE receives reference symbols and processes them to identify the best beam(s) for itself. The UE then informs the BS, e.g., via a feedback channel, the best beam direction(s) and associated information about the channel quality (e.g., channel quality indicator (CQI)). The present disclosure provides different modalities for the feedback channel and feeding back beam selection and associated channel quality information.

In various embodiments, the channel quality information fed back from the UE to the BS involves transmission of the index of the UE preferred (or selected) beams (or spatial directions) and information regarding the channel quality on the set of preferred beams. The essential components of the UL feedback from the UE to the BS includes information about the transmit beam direction and associated channel quality indicator. Both these components may be estimated using reference symbols (e.g., channel state information reference signal (CSI-RS)) transmitted from the BS to the UE. The UE after receiving the reference symbols, estimates the channel on the beams (or spatial direction) supported by the BS. The estimated channel is mapped to a unique index of the channel quality indicator. Each index of the channel quality indicator corresponds to a quantitative assessment of the channel quality in terms of the data rate supported on the channel. For example, from among the set of received beams, the index of the beam corresponding to the largest channel quality indicator may be fed back to the base station.

The UL feedback channel to feedback the preferred beams and the associated CQI is configured by the base station to a mobile station and has a capacity of B bits. The number of beams and the amount of channel quality measurements to feedback is dependent on the transmission mode configured by the BS, the receiver capability of the UE, the transmitter capability of the BS and the scheduling status at the BS. In addition to the preferred transmit beams or spatial directions and the associated CQI, other information, for example, baseband precoder, rank information, whether the CQI information is for the whole bandwidth or a specific portion of the bandwidth and UE buffer information may also be conveyed on the UL feedback channel. The transmission of this other information may be driven by events at the UE and/or the configuration by the BS.

In various embodiments, the UL feedback channel is configured by the BS to be a periodic report, where the periodic report is configured to carry at least one preferred beam index and at least one CQI value. The UL feedback channel configuration includes the assigned resources for transmitting the periodic report, the feedback mode which indicates the periodicity and the type of feedback expected from the UE. The BS may inform the UE of the configuration for the feedback reporting via a configuration message. The UE reports at least one index of the transmit beam that the UE has selected or prefers to the base station to use to transmit downlink data to the UE. Along with the transmitted preferred beam index (or indices), the UE indicates at least one value for channel quality of the beam(s). For example, this channel quality value may be an index from a set of modulation and coding schemes (MCS) that the BS will use to transmit data to the UE. The combination of the beam index (or indices) and at least one channel quality value together indicate to the BS the preferred transmission mode to the UE.

In various embodiments, the beam index (or indices) reported may be expected to change very slowly compared to the CQI. For example, the UE may be relatively stationary and as a result the best beam(s) selected may remain relatively constant. Therefore, the beam index (or indices) may be reported less frequently than the CQI value(s) on the UL feedback channel. The remaining instances of the UL feedback channel may be used to update the BS with the latest of the CQI value(s) associated with the preferred beam(s). For example, every feedback opportunity may be a CQI value except for every Pth feedback opportunity which carries the index of the preferred beam from among a set of beam indices transmitted from the BS. The assumption here is that the preferred beam index and the CQI index both together require greater than the B bit capacity of the UL feedback channel and therefore cannot be transmitted together on one transmission instance of the periodic feedback channel. However, by splitting the transmission so that the CQI and the beam index are transmitted on separate feedback opportunities, the B bit capacity on the UL feedback channel may not be exceeded. If the capacity of the preferred beam index and the CQI together is less than or equal to the B bit UL feedback channel capacity then both the beam index and CQI value can be carried at every feedback opportunity.

In various embodiments, the UE reports more than one beam index and associated CQI values up to a certain number of beams as determined by the capability of the receiver in the UE (e.g., receiver 420). For example, the receiver capability of the UE and the number of beams reported can depend on the number of the receiver radio frequency (RF) and baseband processing chains at the UE. If an UE can receive and process multiple beams, the UE can identify a unique preferred beam for each receiver processing chain independently and convey to the BS the preferred beam and the associated CQI per receiver processing chain. If the information to be conveyed to the BS is greater than B bits capacity of the UL feedback channel, the UE may choose to transmit a portion of the information at every feedback opportunity based on a predetermined or pre-specified configuration. For example, the preferred beam indices for a two receiver chain UE may be feedback in consecutive feedback opportunities occurring every Pth feedback opportunity. In this example, the CQI values for the two beams may be indicated a single feedback opportunity depending on the B bit capacity of the feedback channel. For example, the CQI value for one of the beams may be indicated as a differential of the CQI value for the other beam to reduce signaling overhead.

Figure 6:
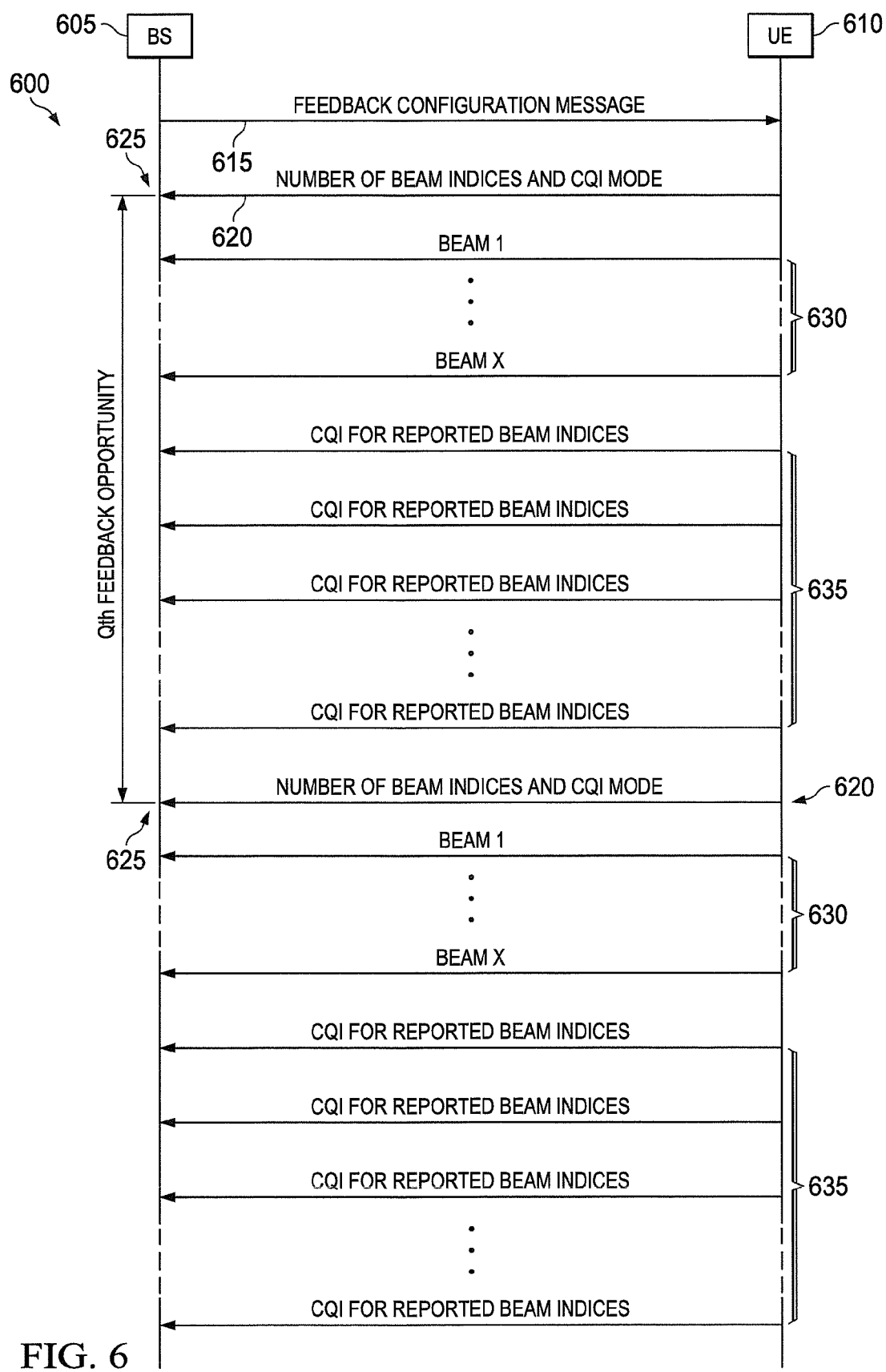
FIG. 6 illustrates a flow diagram of beam index and channel quality information feedback in accordance with various embodiments of the present disclosure.

FIG. 6 illustrates a flow diagram of beam and channel quality information feedback 600 in accordance with various embodiments of the present disclosure. In this illustrative embodiment, the UE 610 reports more than one beam index to the BS 605 and one CQI associated with the set of beam indices sent on the UL feedback channel.

In this illustrative embodiment, the BS 605 or some other network entity configures and sends a feedback configuration message 615 to the UE 610, which will be described in greater detail below. At every Qth feedback opportunity 625, the UE 610 indicates 620 the number of beam indices 620 for which the CQI is to be reported in the UL feedback channel. The UE 610 may also indicate a CQI mode where the UE 610 informs the BS 605 if the reported CQI is as specified the configuration in the feedback configuration message 615. For example, this CQI mode may be a one bit yes or no as to whether the CQI reporting is as expected based on the previously sent feedback configuration message.

The UE 610 derives the indices from the N beams for which the BS 605 transmits the reference symbols. Using the reference symbols, the UE 610 computes the CQI associated for each of the N received beams. Using the computed CQIs, the UE 610 selects a subset of the beams for channel quality reporting. For example, the UE 610 may select beams whose CQI strengths allow for robust reception of downlink data on any of the chosen beams.

Following the indication 620 of the number of beam indices to be reported and the CQI mode, the MS indicates 630 the chosen beam indices in the successive feedback opportunities and indicates 635 the associated CQI values following the beam indices. This reporting order repeats every Qth feedback opportunity 625 unless altered by the BS or de-allocated by the BS. The one bit CQI mode may be used by the MS to default to a specific CQI reporting in cases where the MS is unable to report CQI as requested by the BS from the feedback configuration message 615 whose format is illustrated in Table 1.

Table 1 illustrates an exemplary format of the feedback configuration message 615 transmitted from the BS 605 to the UE 610.

| Item | Bit-Width | Description |
| --- | --- | --- |
| UL feedback type | 1 | Periodic/aperiodic |
| UL feedback mode | 4 | 0x0000 - rank 1 SDMA, 0x0001 - rank 2 SDMA . . . |
| If UL feedback mode == 0x000 | | |
| Number of beam indices reported | 2 | 0x00 - UE determined<br>0x01 - 2 out of received N beams<br>0x10 - 4 out of received N beams<br>0x11 - 8 out of received N beams |
| Periodicity of the beam indices reported | Q | The UE reports the beam indices at a periodicity of $2^{bin2dec(Q)}$ frames, where bin2dec is a conversion function from a binary string to a decimal number |
| If number of beams reported == 0x00 | | |
| CQI reporting mode | 2 | 0x00 - one CQI for all beams reported<br>0x01 - beams only above CQI Threshold to be reported<br>0x10 - differential CQI with respect to CQI Threshold to be reported<br>0x11 - beam indices with c successive CQI value to be reported |

-continued

| Item | Bit-Width | Description |
|---|---|---|
| If CQI reporting mode == 0x01 OR 0x10 | | |
| CQI Threshold | 2 | 0x00 - above CQI index 4 |
| | | 0x10 - above CQI index 6 |
| | | 0x01 and 0x11 - reserved |
| Else if CQI reporting mode == 0x11 | | |
| c | 2 | 0x00 - c = 2 |
| | | 0x10 - c = 4 |
| | | 0x01 and 0x11 - reserved |
| End | | |
| End | | |
| End | | |
| UL resource indexing | RI | Time and frequency location of the feedback channel resource |

As illustrated in table 1, the BS 605 or some other network entity may configure the feedback configuration message 615 to specify the number of beams the UE 610 is to report or may allow the UE to decide the number of beams to report. The BS 605 or some other network entity may configure the CQI reporting modes. In the example illustrated by Table 1, the CQI reporting modes may include different modes, such as one CQI for all beams reported (e.g., an average, mean, largest, smallest, or default CQI value reported for all beams), CQI values for beams only above a certain CQI threshold are reported, a differential value with respect to a CQI threshold is reported for each of the beams, or successive (e.g., "c" successive beams) CQI values for beams (e.g., CQI value for current beam is sum or difference of current reported value and previously reported value). The CQI reporting modes 0x01, 0x10 and 0x11 are exemplary binary representations for reporting beams above threshold CQI, differential CQI above threshold, and c successive CQI values respectively. If the UE 610 is unable to report CQI in the manner requested by the BS 605 for CQI reporting modes 0x01, 0x10 and 0x11, the UE 610 may default to reporting CQI according to CQI reporting mode 0x00.

Using the feedback configuration message 615, the BS 605 may configure the feedback such that the UE 610 reports at least one beam index and one CQI value. The BS 605 may interpret the received CQI value as the best CQI for all reported beams. The BS 605 could also interpret the reported value as the CQI value above a particular threshold CQI value for that UE. In this example, the BS 605 may indicate the threshold CQI value to a particular UE via the feedback configuration message 615. If no beam index exceeds the threshold value, the UE 610 may use a reserved code at the beginning of a Qth feedback opportunity 625 to indicate that no beam index exceeds a threshold value and report at least one beam index and one CQI value associated with the beam index.

The UE 610 may also report the CQI for the chosen subset of beams in a differential fashion starting with the CQI associated with the first beam reported and a differential value with respect to the largest CQI for every successive beam reported until the CQI for all the reported beams have been reported. The UE 610 may determine the number of beams to report based on the estimated CQI for each beams and the capabilities of the UE 610.

In another example, the BS 605 may configure the UL feedback channel for the UE 610 to report multiple beams that exceed a particular threshold and report differential CQI for every beam reported above the threshold. In this example, if the UE is unable to report multiple beams above the threshold, the UE 610 may use a reserved code at the beginning of a Qth feedback opportunity 625 to indicate that the UE 610 is overriding the configuration specified by the BS 605 and will indicate at least one preferred beam index and at least one CQI value associated with the reported beam index.

In other examples, the UE 610 may also report the CQI for a set of reported beams by indicating the minimum and maximum CQI for the reported beams. At every Qth feedback opportunity 625, the UE 610 first indicates the number of beam indices reported on the UL feedback channel followed by an ordered list of beam indices starting from the beam associated with the strongest CQI to the index of the beam associated with the minimum CQI. The UE 610 may determine the number of beams to report based on the estimated CQI for each beams and the capabilities of the UE 610, when configured by the BS 605 to do so. In another example, the BS 605 may configure the UL feedback channel for the UE 610 to report multiple beams along with a minimum and maximum value of the CQI for the reported beams. The UE 610 may indicate the CQI for the minimum and maximum CQI of the set of reported beams at every feedback opportunity that is not used to indicate the beam indices. In an example, where the UE 610 is unable to report multiple beam indices, then the UE 610 can use the reserved code to indicate that the UE 610 is overriding the configuration specified by the BS 605 and will indicate at least one preferred beam index and at least one CQI value associated with the reported beam index.

In various embodiments, the BS 605 may configure the UE 610 to report the indices of beams with CQIs that do not fall below c successive CQI values from the maximum reported CQI. During configuration of the UL feedback channel, in addition to configuring the resources and periodicity of the UL feedback channel, the BS 605 indicates the parameter c indicating the number of successive CQI segments for which the beam indices and the CQI may be reported. In an example where the UE 610 is unable to report multiple beam indices that are c successive CQI values apart, then the UE can use the reserved code to indicate that the UE 610 is overriding the configuration specified by the BS 605 and will indicate at least one preferred beam index and at least one CQI value associated with the reported beam index.

Figure 7:
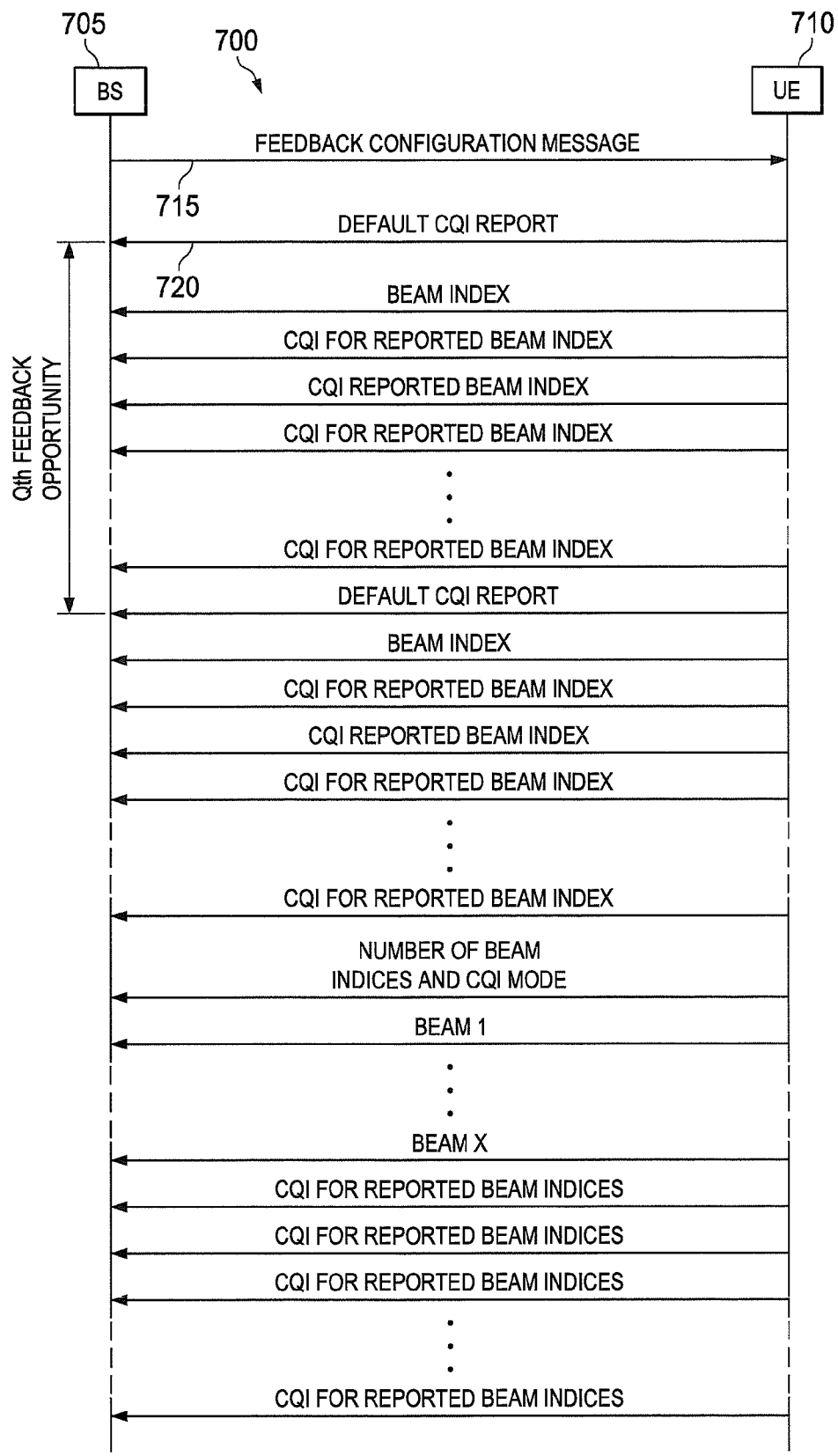
FIG. 7 illustrates a flow diagram of beam index and channel quality information feedback for a default CQI report in accordance with various embodiments of the present disclosure.

FIG. 7 illustrates a flow diagram of beam and channel quality information feedback 700 for a default CQI report in accordance with various embodiments of the present disclosure. In this illustrative example, the UE 710 unable to fulfill CQI reporting according to the requirements set in the feedback configuration message 715. The UE 710 provides the reserved code in the default CQI report 720 to indicate that the UE 710 is overriding the configuration specified by the BS 705. The UE 710 resumes reporting CQI according to the requirements set in the feedback configuration message 715 when the UE 710 is able to meet the requirements set by the BS 705.

Figure 8:
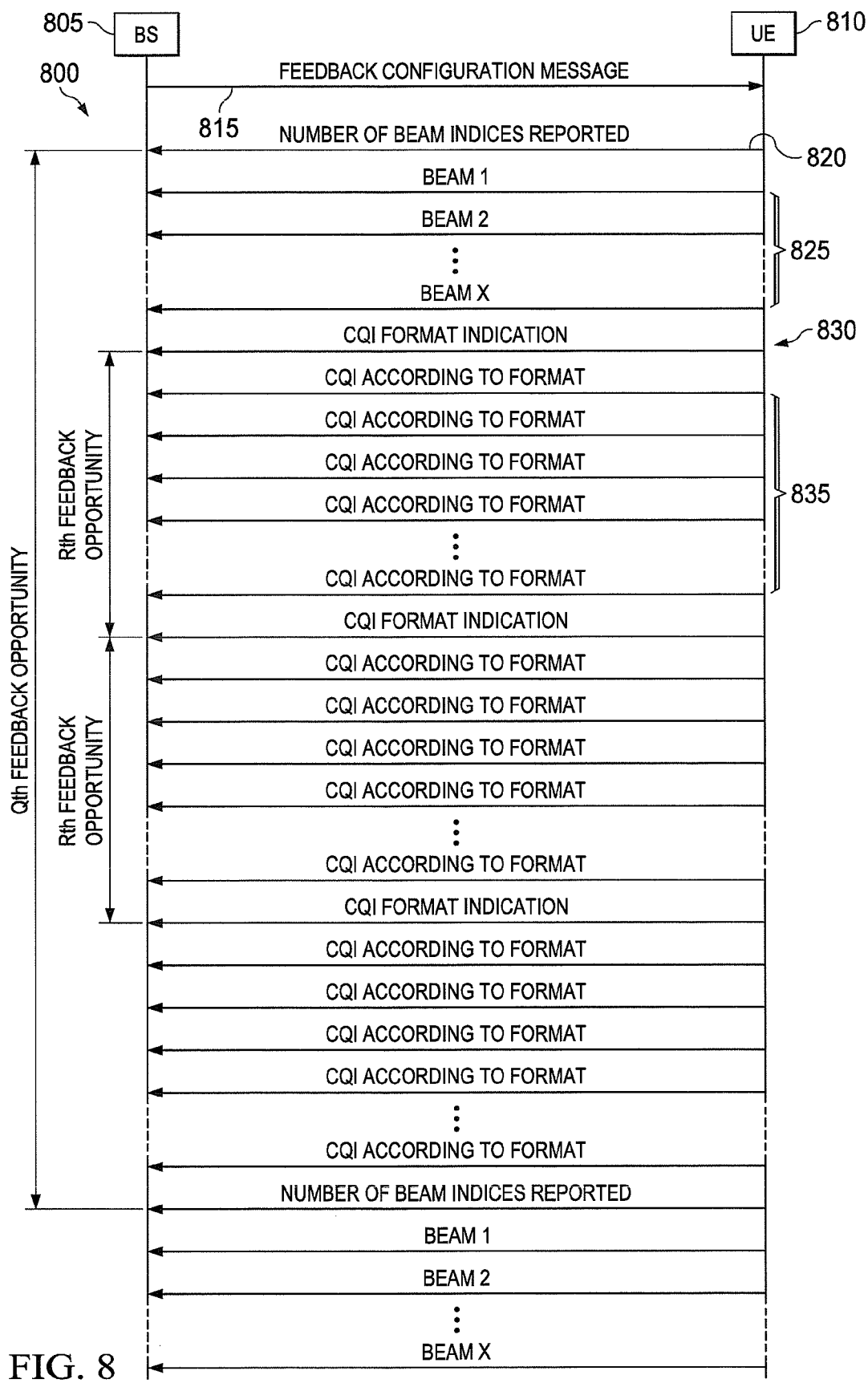
FIG. 8 illustrates a flow diagram of user equipment configurable beam index and channel quality information feedback in accordance with various embodiments of the present disclosure.

FIG. 8 illustrates a flow diagram of user equipment configurable beam and channel quality information feedback 800 in accordance with various embodiments of the present disclosure. In this illustrative embodiment, the BS 805 configures the UL feedback channel for the UE 810 to report multiple beam indices up to a maximum number of indices specified in the UL feedback configuration message 815. The BS 805 can also allow the UE 810 to indicate the CQI reporting mode being used. The UE 810 can update the number of beam indices reported and the CQI reporting mode used at periodic intervals.

| Item | Bit-Width | Description |
|---|---|---|
| UL feedback type | 1 | Periodic/aperiodic |
| UL feedback mode | 4 | 0x0000 - rank 1 SDMA, 0x0001 - rank 2 SDMA ... |
| If UL feedback mode == 0x000 | | |
| Number of beam indices reported | 2 | 0x00 - UE determined<br>0x01 - 2 out of received N beams<br>0x10 - 4 out of received N beams<br>0x11 - 8 out of received N beams |
| Periodicity of the beam indices reported | Q | The UE reports the beam indices at a periodicity of $2^{bin2dec(Q)}$ frames, where bin2dec is a conversion function from a binary string to a decimal number |
| If number of beams reported == 0x00 | | |
| Maximum number of beams reported | 2 | 0x00 - 4<br>0x01 - 8<br>0x10 - 10<br>0x11 - reserved |
| CQI reporting mode | 2 | 0x00 - UE determined CQI reporting<br>0x01 - beams only above CQI Threshold to be reported<br>0x10 - differential CQI with respect to CQI Threshold to be reported<br>0x11 - beam indices with c successive CQI value to be reported |
| If CQI reporting mode == 0x01 OR 0x10 | | |
| CQI Threshold | 2 | 0x00 - above CQI index 4<br>0x10 - above CQI index 6<br>0x01 and 0x11 - reserved |
| Else if CQI reporting mode == 0x11 | | |
| c | 2 | 0x00 - c = 2<br>0x10 - c = 4<br>0x01 and 0x11 - reserved |
| Else | | |
| Periodicity of CQI reporting update | R | The UE updates the CQI reporting mode (if any) at a periodicity of $2^{bin2dec(R)}$ frames, where bin2dec(.) is the conversion function from a binary string to a decimal number |
| End | | |
| End | | |
| End | | |
| UL resource indexing | RI | Time and frequency location of the feedback channel resource |

In these embodiments, the BS 805 can set the CQI reporting mode to 0x00 in the feedback configuration message 815 which indicates to the UE 810 that in addition to indicating the number of beams it is reporting, the UE 810 also needs to report the type of CQI being reported (e.g., the CQI reporting mode) for the reported beam indices. CQI reporting mode 0x00 is an exemplary binary representation for UE determined CQI reporting parameter. Other representations may be used to indicate the specified reporting mode. If the feedback configuration message 815 indicates that the CQI reporting mode is UE determined, then a periodicity R for updating of the CQI reporting mode is also indicated for the UE 810 to update the type of CQI reporting. If the feedback configuration message specifies the UE determined CQI reporting mode, then the UE 810 indicates the number of beam indices reported 820, the beam indices 825, and the format of the CQI reporting 830. For example, the UE 810 may indicate whether the CQI report is on a per beam basis, or successive CQI values from the indicated CQI. The UE 810 then indicates the CQI values 835 in accordance with the indicated CQI reporting mode. If there is a high enough capacity in the UL feedback channel, then the CQI reporting mode 830, the number of beam indices 820 and/or the beam indices 825 can be grouped and transmitted together in successive feedback opportunities.

In various embodiments, the UE 810 may use a CQI format code to indicate to the BS 820 the format of the CQI reports. The UE 810 may use a CQI format indicator or CQI format code, when the BS 805 configures the UL feedback for the UE 810 to use the UE determined CQI reporting mode. An exemplary table illustrating different CQI format codes for CQI format indication from the UE 810 on the UL feedback channel is shown in Table 3. In the example illustrated by the format codes in Table 3, the UE 810 uses the CQI format code to indicate if the UE 810 is reporting the CQI for the reported beams on a per-beam basis, using an ordered reporting format where the beams are ordered according to increasing or decreasing CQI for which the CQI is reported in a differential manner, or a successive CQI indication with one CQI value and indicates whether successive values are increasing or decreasing.

Table 3 illustrates an exemplary CQI format code for CQI format indication from the UE 810 on the UL feedback channel.

| CQI format code | Used CQI format |
|---|---|
| 0x000 | CQI on an individual beam basis |
| 0x001 | CQI of beams arranged in decreasing CQI values where CQI of first beam is reported followed by differential CQI with respect to the first beam for successive beams |
| 0x010 | Successive CQI values for reported beams arranged according to decreasing CQI values where the CQI of the first reported beam is indicated followed by a 1 step CQI decrease for every successive beam index reported |
| 0x011-0x111 | reserved |

In various embodiments of the present disclosure, the BS 805 can configure the CQI and beam indices reports on the UL feedback channel using the feedback configuration message 815 sent to each subscribing UE. The BS 805 or some other network entity can manage the content of the message 815 and the UE 810 reports information on the UL feedback channel as requested by the BS 805 in the feedback configuration message 815. The feedback configuration message 815 can be used to determine the number of beams, the number of beam indices to report, the multiplicity of CQI to be reported, the periodicity of the allocation, the periodicity of the beam indices reporting and the periodicity of the CQIs to be reported.

In various embodiments of the present disclosure, the UE 810 reports more than one beam index and the associated CQI up to a certain number determined by the capability of the UE 810 as well as the capability of the BS 805. For example, the transmitter capability at the BS 805 may be the number of receiver radio frequency (RF) and baseband processing chains at the BS 805. The UE 810 can identify a unique set of preferred beams that the BS 805 may use to transmit to the UE 810 and the associated CQI associated with the reported beams.

Figure 9:
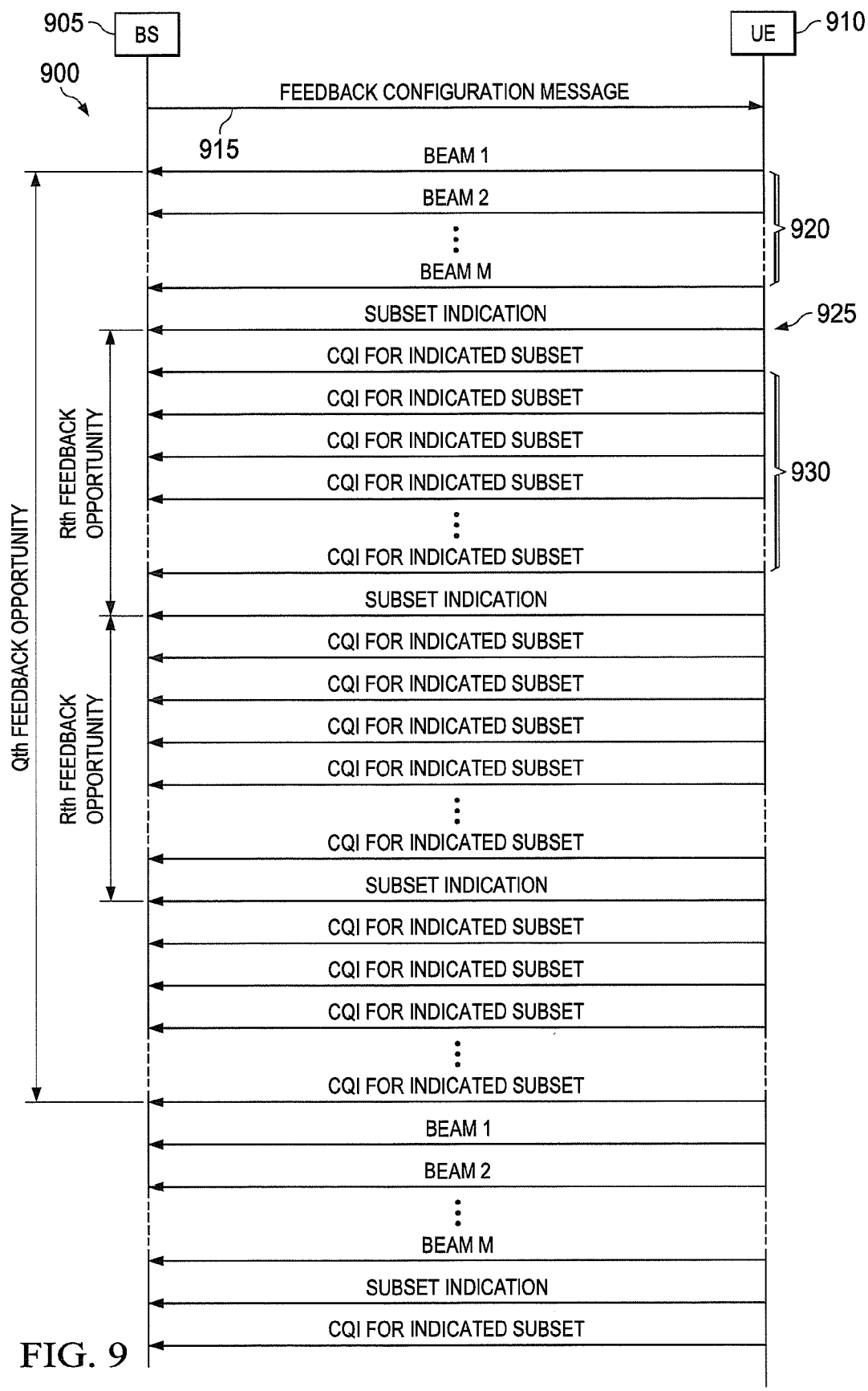
FIG. 9 illustrates a flow diagram of beam index and channel quality information feedback for a selected subset of beams in accordance with various embodiments of the present disclosure.

FIG. 9 illustrates a flow diagram 900 of beam index and channel quality information feedback for a selected subset of beams in accordance with various embodiments of the present disclosure. In this illustrative embodiment, the UE 910 reports M indices of the received N beams for feedback.

The UE 910 may select the M indices to report based on the received strengths, channel quality, receiver capability etc. The UE 910 transmits the selected M indices to the base station using the configured UL feedback channel. During configuration of the UL feedback channel, the BS 905 indicates the parameter M indicating that the UE 910 can choose a subset consisting of M beam indices of the N beam codebook. The UE 910 reports the selected M indices periodically in an interval (e.g., every Rth feedback opportunity) that can be determined and configured by the BS 905 in feedback configuration message 915. Meanwhile, the UE 910 reports the CQI associated with the M indices more frequently (e.g., in each UL feedback opportunity that is not used for updating the M beam indices). The reported CQI could be for a subset of reported M beam indices. The CQI reports allow for reporting one of the allowable subsets of the selected M indices. The chosen subset and the CQI associated with the subset are transmitted in the UL feedback opportunity.

The UE 910 first reports M beam indices 920 as requested by the BS 905. The UE 910 then reports the subset indication 925 and the CQI reporting 930 at different reporting opportunities. The UE 910 repeats the beam indices reporting every Qth feedback opportunity. In the example embodiment illustrated in FIG. 9, the capacity of the UL feedback channel is four bits. This capacity in the UL feedback channel implies that more than one beam index can be transmitted together in the same feedback opportunity. The BS 905 sends the feedback configuration message 915 to set up the UL feedback channel and the reporting mode that the UE 910 needs to use to transmit the UL feedback information. In the feedback configuration message 915, the BS 905 indicates to the UE 910 the feedback mode, the periodicity of the feedback reports, different reporting configurations etc. An exemplary format for the feedback configuration message 915 for BS configured M beam index reporting with no subset restriction for CQI is illustrated in Table 4 below.

| Item | Bit-Width | Description |
| --- | --- | --- |
| UL feedback type | 1 | Periodic/aperiodic |
| UL feedback mode | 4 | 0x0000 - rank 1 SDMA, 0x0001 - rank 2 SDMA . . . |
| If UL feedback mode == 0x000 | | |
| Number of beam indices reported | 2 | 0x00 - UE determined<br>0x01 - 2 out of received N beams<br>0x10 - 4 out of received N beams<br>0x11 - 8 out of received N beams |
| Periodicity of the beam indices reported | Q | The UE reports the beam indices at a periodicity of $2^{bin2dec(Q)}$ frames, where bin2dec is a conversion function from a binary string to a decimal number |
| If number of beams reported == 0x00 | | |
| CQI reporting mode | 2 | 0x00 - no subset restriction<br>0x01 - subset restriction<br>0x10 and 0x11 - reserved |
| Periodicity of subset reporting | R | The UE reports the chosen subset for CQI reporting at a periodicity of $2^{bin2dec(R)}$ frames, where bin2dec(.) is the conversion function from a binary string to a decimal number |
| If CQI reporting mode == 0x01 | | |
| Restricted subsets | M | Variable size dependent on the number of beam reported as well as the number of subsets not allowed for reporting |
| End | | |
| End | | |
| End | | |
| UL resource indexing | RI | Time and frequency location of the feedback channel resource |

In various embodiments, the UE 910 may indicate the chosen subset that's CQI corresponds to the reported CQI using an indexing scheme for the subset. In the indexing scheme, each of the allowable subsets of beams has a specific index. The index may start with subsets that correspond to a single beam and continue to subsets with multiple beams. An exemplary mapping of the chosen subset to a specified index is shown in the Table 5. Table 5 illustrates an exemplary indexing scheme for indicating different subsets to report CQI for an example embodiment where M=4 beams.

| Allowable subsets of 4 beams | Binary index for transmission |
| --- | --- |
| {1} | 0x0000 |
| {2} | 0x0001 |
| {3} | 0x0010 |
| {4} | 0x0011 |
| {1, 2} | 0x0100 |
| {1, 3} | 0x0101 |
| {1, 4} | 0x0110 |
| {2, 3} | 0x0111 |
| {2, 4} | 0x1000 |
| {3, 4} | 0x1001 |
| {1, 2, 3} | 0x1010 |
| {1, 2, 4} | 0x1011 |
| {2, 3, 4} | 0x1100 |
| {1, 2, 3, 4} | 0x1101 |

In various embodiments of the present disclosure, the UE 910 reports M indices of the received N beams in the UL feedback channel in every Q feedback opportunities and reports CQI on a few of the allowable subsets of the chosen M indices at every feedback opportunity that is not used to transmit the selected M beam indices. During configuration of the UL feedback channel, the BS 905 indicates the parameter M indicating that UE 910 can choose a subset consisting of M beam indices of the N beam codebook and the class of allowable subsets of the M indices for which the CQI needs to be reported. The UE 910 decodes the UL feedback configuration message to configure the UL feedback channel and uses the assigned resources to transmit the UL feedback information.

In various embodiments, the UE 910 reports M indices of the received N beams in the UL feedback channel in every Q feedback opportunity and reports CQI for the subset of beams whose indices do not exceed the configured dimensions of the baseband precoder. During configuration of the UL feedback channel, the BS 905 indicates the parameter M indicating that the UE 910 chooses a subset consisting of M beam indices of the N beam codebook. The UE 910 may also receive another configuration message, possibly via the physical downlink control channel (PDCCH), the broadcast control channel (BCH) or any other control channel, indicating the class of baseband precoders the BS 905 is willing to use for the UE 910. The UE 910 decodes the control channel and the feedback configuration message 915 to configure the UL feedback channel and uses the assigned resources to transmit the UL feedback information.

Figure 10:
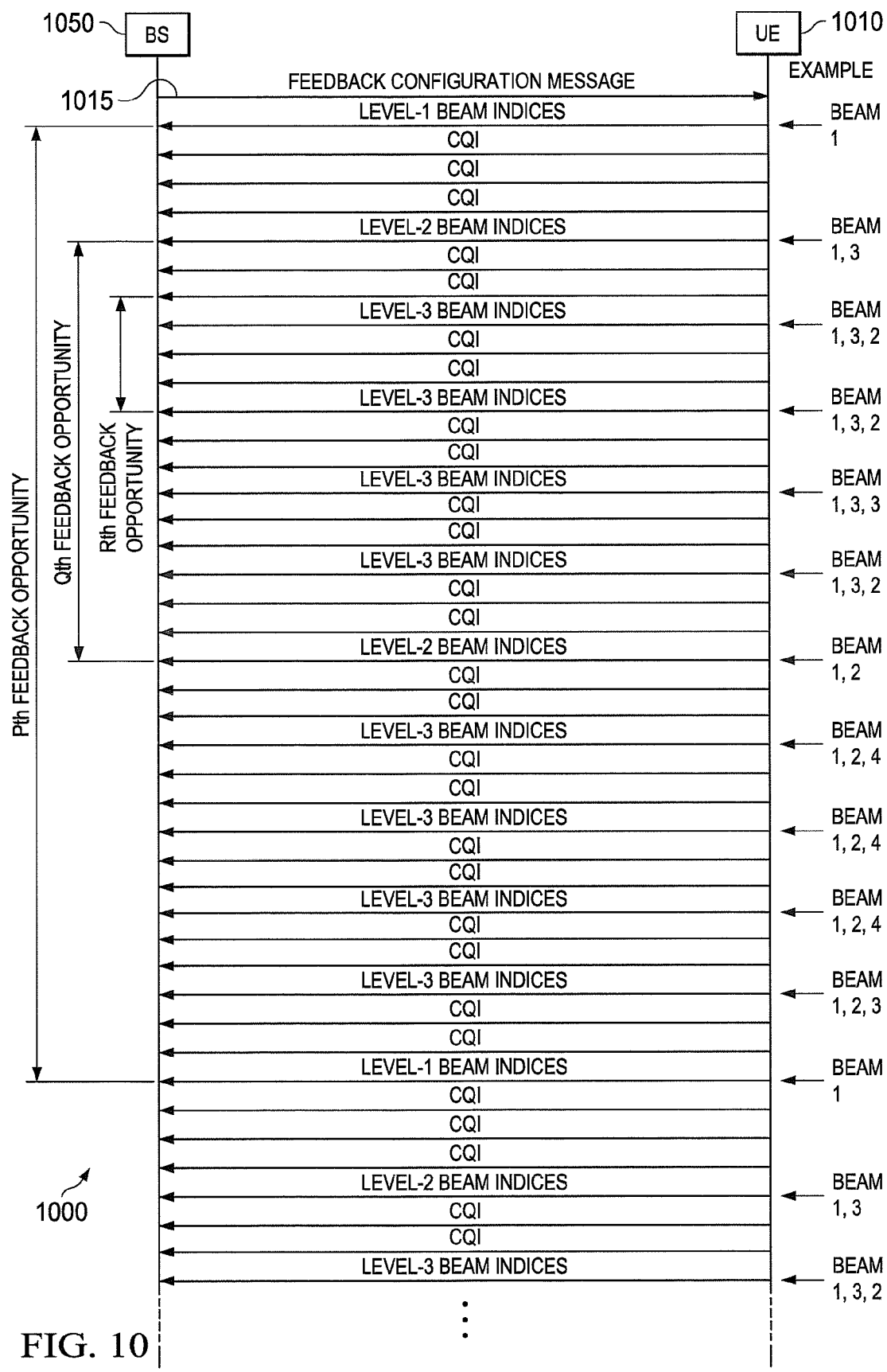
FIG. 10 illustrates a flow diagram of multi-level beam indices and channel quality information feedback in accordance with various embodiments of the present disclosure.

FIG. 10 illustrates a flow diagram 1000 of multi-level beam indices and channel quality information feedback in accordance with various embodiments of the present disclosure. In various embodiments of the present disclosure, the BS 1005 configures feedback according to a multi-level codebook of beams where the feedback for every increasing level of beam codebook is conditioned on the chosen beam index of the previous level. The number of levels of codebooks may be indicated by the BS 1005 to the UE 1010 or may be predetermined. The UE 1010 first indicates a preferred beam index from a level 1 of the codebook. When the UE 1010 indicates the preferred beam index from level 1 of the codebook, the next level of beam indices that the UE 1010 can indicate is limited to a set of beam indices which are extended from the reported index in level 1 of the codebook.

Figure 11:
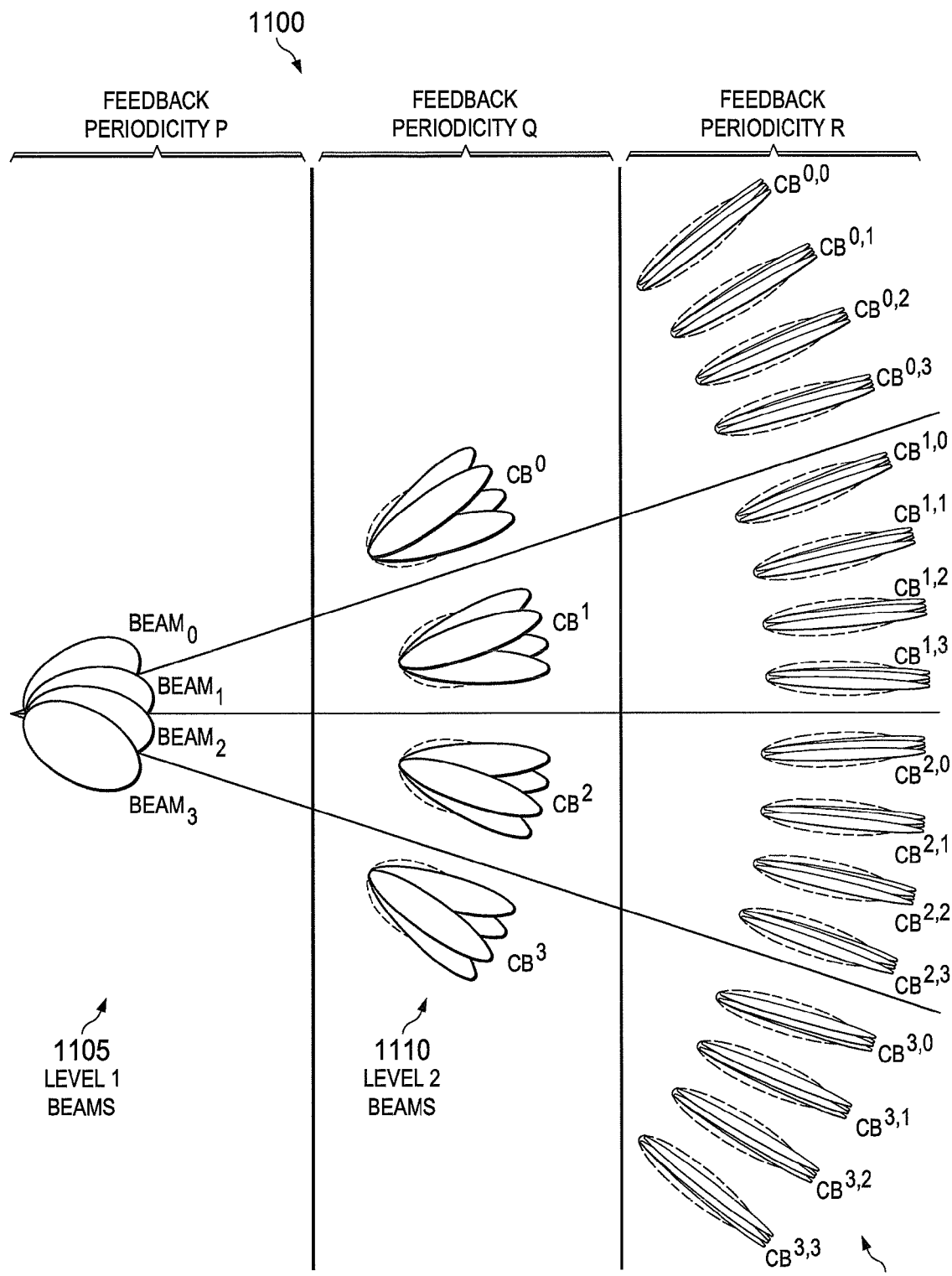
FIG. 11 illustrates an example of a multi-level codebook of beams in accordance with various embodiments of the present disclosure.

FIG. 11 illustrates an example of a multi-level codebook 1100 of beams in accordance with various embodiments of the present disclosure. In the example illustrated, the multi-level codebook 1100 includes three levels (1105, 1110, and 1115) with each beam in each level branching into four beams in lower levels. As illustrated, the choice of beam index in level 1 of the codebook determines the set of reportable beam indices in the level 2 and level 3 codebooks. For example, if the UE 1110 chooses beam 1 in the level 1 of the codebook as a preferred beam, the UE can only choose beams from codebook CB1 in level 2 and codebooks CB1,0; CB1,1; CB1,2; and CB1,3 in level 3. If the UE 1110 further chooses beam 1,3 among the beams in codebook CB1 in level 2, the choice of codebooks in level 3 is further constrained to the beams belonging to codebook CB1,3.

In various embodiments of the present disclosure, the BS 1005 or some other network entity may configure the feedback periodicity for the multi-level beam codebook to increase with each increasing level for the codebook. For example, as illustrated in FIG. 11, the beams in level 1 of the codebook have the largest beam-width, while the beams in level 2 have a narrow beam-width than those in level 1, beams in level 3 narrower than those in level 2. Given the varying beam widths, the desire to change level 1 beam selections is expected to occur less frequently then level 2 beam sections and correspondingly for level 3 beam selections. Accordingly, the BS 1005 or some other network entity may configure the feedback periodicities for each level to increase with each increasing level of codebook.

Returning to the example embodiment illustrated in FIG. 10, the UE 1010 feeds back level 1 beams every Pth feedback opportunity, level 2 beam indices every Qth feedback opportunity and the level 3 beam indices every Rth feedback opportunity. As illustrated, the quantities for the feedback periodicities P, Q and R are P>Q>R. The higher the value of the feedback periodicity, the more infrequent the feedback for that level of the codebook. At each level of the codebook, one or more beam indices may be feedback. If more than one beam indices are transmitted in a feedback opportunity, then the CQI to beam indices mapping may be configured to have a format as described in the various embodiments above.

Using the multi-level codebook and the varying feedback periodicities, the UE 1010 is able to reduce signaling overhead used to indicate the selection of beam indices. In an example where 64 different beams may be selected, indication of a single beam may require six bits each time the beam index is fed back. However, at each Rth feedback opportunity only two bits may be required to distinguish among the four possible level 3 beams given that the level 1 and level 2 beam selections have already been feedback. Accordingly, embodiments of the present disclosure leverage the fact that wider beam selection changes may occur less frequently and allow finer beam selection to occur more frequently.

Although embodiments the of the present disclosure may be described in the context of communication with millimeter waves, embodiments of the present disclosure may also be implemented in other communication media, e.g., radio waves with frequency of 10 GHz-30 GHz that exhibit similar properties as millimeter waves, or in existing cellular communication bands. Further, various embodiments of the present disclosure may also be implemented using electromagnetic waves with terahertz frequencies, infrared, visible light, and other optical media.

FIG. 12 illustrates a flowchart of a process for reporting channel quality information in accordance with various embodiments of the present disclosure. For example, the process depicted in FIG. 12 may be performed by a user equipment (UE), such as the node 400 in FIG. 4.

The process begins by measuring channel quality parameters for signals received on a plurality of beams (step 1205). For example, in step 1205, the UE may measure a signal strength of the received signal, such as a received signal strength indicator (RSSI).

The process then selects one or more of the beams for channel quality reporting (step 1210). For example, in step 1210, the UE may select the beams for reporting as the beams having the strongest received signal strength. The number of selected beams may be indicated in a feedback configuration message or selected by the UE based on the capabilities of the UE and/or the BS.

Thereafter, the process maps indices of the selected beams to channel quality values (step 1215). For example, in step 1215, the UE may map the indices according to the CQI reporting mode to indicate how the fed back values correspond to the selected beams. This CQI reporting mode may be determined based on a configuration message received from a base station. For example, the UE may feedback one CQI value for each beam, one CQI value for all of the beams, a differential value with respect to a CQI threshold for each beam, a sequential value relative to a value for previous beam, and/or any other of the mapping schemes described herein. In some embodiments, the CQI reporting mode may be determined by the UE. In these embodiments, the UE may transmit the UE determined CQI reporting mode to the BS.

The process then sends the indices of the selected beams (step 1220). For example, in step 1220, the UE may report the beam indices according to a specified periodicity. The UE may report a selected subset of beams according to an indexing scheme. In other examples, the UE may report selection of beams in different levels of a multi-level codebook at different periodicities as described above.

Thereafter, the process sends channel quality information for the selected beams (step 1225). For example, in step 1225, the UE reports channel quality information according to the mapping to indicate the reported CQI value of each beam to the BS. The UE reports the channel quality information according to the CQI reporting mode and at the feedback periodicity specified in the feedback configuration message. If for some reason, the UE is unable to follow the specified reporting mode; the UE may default to a default reporting mode of reporting one CQI value for each beam index reported. Thereafter, the UE continues to measure, select, map, and report the beam indices and associated channel quality information to maintain efficient and effective wireless communication between the UE and BS.

FIG. 13 illustrates a flowchart of a process for identifying channel quality information in accordance with various embodiments of the present disclosure. For example, the process depicted in FIG. 13 may be performed by a network entity (e.g., node 400 in FIG. 4), such as a base station, a network management server, or a remote radio head.

The process begins by sending a configuration message (step 1305). For example, in step 1305, the BS or some other network entity configures the feedback channel using the configuration message. The configuration message may be set up to indicate a CQI reporting mode for the UE to use in the mapping of the indices of the one or more selected beams to the one or more CQI values, a number of beams for CQI reporting, a different feedback periodicities, threshold values, and/or any other information for configuring the UL feedback channel.

The process then receives indices of one or more beams selected for reporting (step 1310). For example, in step 1310, the BS or some other network entity receives the UE selection of preferred or best beams. Thereafter, the process receives channel quality information for the selected beams (step 1315). The process then identifies a mapping of the indices to channel quality values (step 1320). For example, in step 1320, the BS or some other network entity may identify the mapping based on the CQI reporting scheme in place or a default CQI reporting scheme. In some embodiments, the BS may receive the mapping from the UE. In some embodiments, the BS or some other network entity may identify the mapping according to a multi-level codebook.

Thereafter, the process identifies a channel quality value for each of the selected beams (step 1325). For example, in step 1325, the BS or some other network entity identifies the reported CQI value for each of the UE selected beams. Thereafter, the BS or some other network entity continues to configure the UL feedback channel, receive reported indices and channel quality information, and identify the CQI values for the reported beams to maintain efficient and effective wireless communication between the UE and BS.

Although FIGS. 12 and 13 illustrate examples of processes for reporting channel quality information and identifying channel quality information, respectively, various changes could be made to FIGS. 12 and 13. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for reporting channel quality information by a user equipment (UE), the method comprising:
   selecting beams for channel quality reporting;
   mapping, by the UE, indices of the selected beams to one or more channel quality values;
   indicating indices of the selected beams during one portion of a reporting period; and
   sending channel quality information for the selected beams according to the mapping during an other portion of the reporting period, the channel quality information sent during the other portion indicating more than one channel quality value for one of the selected beams before any re-indication of the index of the one selected beam during the reporting period.

2. The method of claim 1 further comprising:
   measuring channel quality parameters associated with signals received on a plurality of beams;
   selecting the beams for channel quality reporting from the plurality of beams based on the measured channel quality parameters.

3. The method of claim 1 further comprising identifying, based on a configuration message received from a base station, a number of the beams for channel quality reporting as one of a pre-specified number of beams or a UE selectable number of beams.

4. The method of claim 1, wherein the channel quality values are values for a channel quality indicator (CQI), the method further comprising:
   determining a CQI reporting mode based on a configuration message received from a base station,
   wherein mapping the indices of the selected beams to the one or more CQI values comprises mapping the indices of the selected beams to the one or more CQI values according to the CQI reporting mode, and
   wherein sending the channel quality information for the selected beams according to the mapping comprises sending the channel quality information according to the CQI reporting mode.

5. The method of claim 4, wherein sending the channel quality information according to the CQI reporting mode comprises during the other portion of the reporting period one of:
   sending one CQI report for all of the selected beams at each feedback opportunity in the other portion;
   sending a CQI report for only the selected beams having a CQI value that is greater than a threshold CQI value;
   sending a differential value representing a difference of a CQI value for a selected beam with respect to a threshold CQI value; or
   sending a successive CQI value representing a difference of a CQI value for a selected beam with respect to a CQI value for a previously reported beam.

6. The method of claim 1, wherein:
   the selected beams are a subset of available beams for channel quality reporting; and
   indicating the indices of the selected beams comprises sending a message comprising an indication of the selected subset of beams being reported according to an indexing scheme for reporting the indices of the selected subset of beams prior to sending the channel quality information for the selected beams.

7. The method of claim 6 further comprising:
   determining whether to modify the selected subset of beams being reported; and
   in response to determining to modify the selected subset, sending, after the other portion of the reporting period, a message comprising an indication of the modified subset of beams being reported according to a pre-specified reporting periodicity.

8. The method of claim 6, wherein the channel quality values are values for a channel quality indicator (CQI), the method further comprising:
   determining a CQI reporting mode based on a configuration message received from a base station,
   wherein sending the channel quality information for the selected beams according to the mapping comprises sending the channel quality information according to the CQI reporting mode.

9. The method of claim 1 further comprising sending a message comprising an indication of the indices of the selected beams according to a codebook of beams, wherein the codebook includes multiple levels, and wherein beam indices selectable in a lower level in the codebook are dependent upon a selected beam index of a higher level in the codebook.

10. The method of claim 9, wherein each of the multiple levels in the codebook is associated with a respective feedback periodicity, and wherein a feedback periodicity for the lower level is shorter than a feedback periodicity for the higher level.

11. The method of claim 9 further comprising:
determining whether to modify the selection of the one or more beams selected for channel quality reporting;
in response to determining to modify the selection, determining whether a beam index of a newly selected beam is within a range of beam indices selected from the higher level in the codebook; and
in response to determining that the beam index is not within the range of beam indices, sending a message comprising an indication of the beam index of the newly selected beam according to a feedback periodicity associated with the higher level.

12. The method of claim 1, wherein the channel quality values are values for a channel quality indicator (CQI), the method further comprising:
determining a CQI reporting mode based on a configuration message received from a base station; and
in response to the UE being unable to send the channel quality information according to the CQI reporting mode, sending the channel quality information as a default CQI report including a default CQI for a beam.

13. An apparatus in a user equipment (UE) configured to report channel quality information, the apparatus comprising:
a controller configured to select beams for channel quality reporting, and map indices of the selected beams to one or more channel quality values; and
a transmitter configured to indicate indices of the selected beams during one portion of a reporting period; and send channel quality information for the selected beams according to the mapping during an other portion of the reporting period, the channel quality information sent during the other portion indicating more than one channel quality value for one of the selected beams before any re-indication of the index of the one selected beam during the reporting period.

14. The apparatus of claim 13, wherein:
the controller is configured to measure channel quality parameters associated with signals received on a plurality of beams, and select the beams for channel quality reporting from the plurality of beams based on the measured channel quality parameters.

15. The apparatus of claim 13, wherein the controller is configured to identify, based on a configuration message received from a base station, a number of the beams for channel quality reporting as one of a pre-specified number of beams or a UE selectable number of beams.

16. The apparatus of claim 13, wherein the channel quality values are values for a channel quality indicator (CQI), wherein:
the controller is configured to identify a CQI reporting mode based on a configuration message received from a base station, and map the indices of the selected beams to the one or more CQI values according to the identified CQI reporting mode, and
the transmitter is configured send the channel quality information according to the CQI reporting mode.

17. The apparatus of claim 16, wherein in sending the channel quality information according to the CQI reporting mode, the transmitter is further configured to, during the other portion of the reporting period, one of:
send one CQI report for all of the selected beams at each feedback opportunity in the other portion,
send a CQI report for only the selected beams having a CQI value that is greater than a threshold CQI value,
send a differential value representing a difference of a CQI value for a selected beam with respect to a threshold CQI value, or
send a successive CQI value representing a difference of a CQI value for a selected beam with respect to a CQI value for a previously reported beam.

18. The apparatus of claim 13, wherein:
the selected beams are a subset of available beams for channel quality reporting, and
to indicate the indices of the selected beams, the transmitter is configured to send a message comprising an indication of the selected subset of beams being reported according to an indexing scheme for reporting the indices of the selected subset of beams prior to sending the channel quality information for the selected beams.

19. The apparatus of claim 18, wherein:
the controller is configured to determine whether to modify the selected subset of beams being reported, and
the transmitter is configured to send, in response to a determination to modify the selected subset and after the other portion of the reporting period, a message comprising an indication of the modified subset of beams being reported according to a pre-specified reporting periodicity.

20. The apparatus of claim 18, wherein the channel quality values are values for a channel quality indicator (CQI),
wherein the controller is configured to determine a CQI reporting mode based on a configuration message received from a base station, and
wherein in sending the channel quality information for the selected beams according to the mapping, the transmitter is further configured to send the channel quality information according to the CQI reporting mode.

21. The apparatus of claim 13, wherein the transmitter is configured to send a message comprising an indication of the indices of the selected beams according to a codebook of beams, wherein the codebook includes multiple levels, and wherein beam indices selectable in a lower level in the codebook are dependent upon a selected beam index of a higher level in the codebook.

22. The apparatus of claim 21, wherein each of the multiple levels in the codebook is associated with a respective feedback periodicity, and wherein a feedback periodicity for the lower level is shorter than a feedback periodicity for the higher level.

23. The apparatus of claim 21, wherein:
the controller is configured to determine whether to modify the selection of the one or more beams selected for channel quality reporting; determine, in response to a determination to modify the selection, whether a beam index of a newly selected beam is within a range of beam indices selected from the higher level in the codebook, and
the transmitter is configured to send, in response to a determination that the beam index is not within the range of beam indices, a message comprising an indication of the beam index of the newly selected beam according to a feedback periodicity associated with the higher level.

24. The apparatus of claim 13, wherein the channel quality values are values for a channel quality indicator (CQI), wherein:

the controller is configured to identify a CQI reporting mode based on a configuration message received from a base station; and the transmitter is configured send, in response to the UE being unable to send the channel quality information according to the CQI reporting mode, the channel quality information as a default CQI report including a default CQI for a beam.

25. A method for identifying channel quality information by a network entity, the method comprising:

receiving an indication of indices of beams selected for reporting sent during one portion of a reporting period;

receiving channel quality information for the selected beams sent during an other portion of the reporting period, the channel quality information sent during the other portion indicating more than one channel quality value for one of the selected beams before any re-indication of the index of the one beam during the reporting period;

identifying, by the network entity, a mapping of the indices of the selected beams to one or more channel quality values; and identifying more than one channel quality value for the one selected beam according to the mapping.

26. The method of claim 25, wherein the channel quality values are values for a channel quality indicator (CQI), the method further comprising sending a configuration message indicating a CQI reporting mode for a user equipment to use in the mapping of the indices of the selected beams to the one or more CQI values and indicating a number of beams for CQI reporting as one of a pre-specified number of beams or a user equipment selectable number of beams.

27. The method of claim 25, wherein the channel quality values are values for a channel quality indicator (CQI), the method further comprising:

sending a configuration message indicating a CQI reporting mode for selecting a subset of available beams for channel quality reporting, indicating a periodicity for reporting the indices of the selected subset of beams, and indicating a maximum number of beams to be included in the selected subset of beams, wherein receiving the indication of the indices of one or more beams selected for reporting comprises receiving the indication of the subset of selected beams at the periodicity and according to an indexing scheme for reporting the indices of the selected subset of beams.

28. The method of claim 25 further comprising receiving a message comprising an indication of the indices of the selected beams according to a codebook of beams, wherein the codebook includes multiple levels, wherein beam indices selectable in a lower level in the codebook are dependent upon a selected beam index of a higher level in the codebook, wherein each of the multiple levels in the codebook is associated with a respective feedback periodicity, and wherein a feedback periodicity for the lower level is shorter than a feedback periodicity for the higher level.

29. The method of claim 25, wherein the network entity is one of a base station, a network management server, and a remote radio head.

30. The method of claim 25, wherein the channel quality values are values for a channel quality indicator (CQI), the method further comprising:

sending a configuration message indicating a CQI reporting mode for a user equipment to use in the mapping of the indices of the selected beams to the one or more CQI values; and receiving the channel quality information as a default CQI report including a default CQI for a beam in response to the user equipment being unable to use the indicated CQI reporting mode.

31. An apparatus in a network entity configured to identify channel quality information, the apparatus comprising:

a receiver configured to receive an indication of indices of beams selected for reporting sent during one portion of a reporting period and receive channel quality information for the selected beams sent during an other portion of the reporting period, the channel quality information sent during the other portion indicating more than one channel quality value for one of the selected beams before any re-indication of the index of the one beam during the reporting period; and a controller configured to identify a mapping of the indices of the selected beams to one or more channel quality values and identify more than one channel quality value for the one selected beam according to the mapping.

32. The apparatus of claim 31, wherein the channel quality values are values for a channel quality indicator (CQI), the apparatus further comprising:

a transmitter configured to send a configuration message indicating a CQI reporting mode for a user equipment to use in the mapping of the indices of the selected beams to the one or more CQI values and indicating a number of beams for CQI reporting as one of a pre-specified number of beams or a user equipment selectable number of beams.

33. The apparatus of claim 31, wherein the channel quality values are values for a channel quality indicator (CQI), the apparatus further comprising:

a transmitter configured to send a configuration message indicating a CQI reporting mode for selecting a subset of available beams for channel quality reporting, indicating a periodicity for reporting the indices of the selected subset of beams, and indicating a maximum number of beams to be included in the selected subset of beams, wherein the receiver is configured to receive the indication of the subset of selected beams at the periodicity and according to an indexing scheme for reporting the indices of the selected subset of beams.

34. The apparatus of claim 31, wherein the receiver is further configured to receive a message comprising an indication of the indices of the selected beams according to a codebook of beams, wherein the codebook includes multiple levels, wherein beam indices selectable in a lower level in the codebook are dependent upon a selected beam index of a higher level in the codebook, wherein each of the multiple levels in the codebook is associated with a respective feedback periodicity, and wherein a feedback periodicity for the lower level is shorter than a feedback periodicity for the higher level.

35. The apparatus of claim 31, wherein the network entity is one of a base station, a network management server, and a remote radio head.

36. The apparatus of claim 31, wherein the channel quality values are values for a channel quality indicator (CQI), the apparatus further comprising:

a transmitter configured to send a configuration message indicating a CQI reporting mode for a user equipment to use in the mapping of the indices of the selected beams to the one or more CQI values, wherein the receiver is configured to receive the channel quality information as a default CQI report including a default CQI for a beam in response to the user equipment being unable to use the indicated CQI reporting mode.

* * * * *